(12) United States Patent
Bennett

(10) Patent No.: US 7,299,928 B2
(45) Date of Patent: Nov. 27, 2007

(54) TRUCKER'S ORGANIZATION AND STORAGE UNIT

(76) Inventor: Rufus E. Bennett, 901 Andrews Rd., Opelika, AL (US) 36801

( * ) Notice: Subject to any disclaimer, the term of this patent is extended or adjusted under 35 U.S.C. 154(b) by 521 days.

(21) Appl. No.: 10/946,535

(22) Filed: Sep. 22, 2004

(65) Prior Publication Data

US 2006/0060497 A1    Mar. 23, 2006

(51) Int. Cl.
*B65D 5/50* (2006.01)
(52) U.S. Cl. .................... 206/762; 206/45.24
(58) Field of Classification Search ............ 206/45.24, 206/38, 745, 747, 762, 575, 579; 190/107, 190/122, 123
See application file for complete search history.

(56) References Cited

U.S. PATENT DOCUMENTS

| 1,663,397 | A | * | 3/1928 | Bunnell | .................... 40/124.2 |
| 3,816,948 | A | * | 6/1974 | Mooney et al. | ............... 40/388 |
| 4,651,872 | A | * | 3/1987 | Joyce | ......................... 206/760 |
| 5,551,616 | A | * | 9/1996 | Stitt et al. | .................... 224/275 |
| 6,082,545 | A | * | 7/2000 | Ford et al. | .................. 206/579 |
| 7,086,511 | B2 | * | 8/2006 | Morszeck et al. | .......... 190/122 |

\* cited by examiner

*Primary Examiner*—David T. Fidei

(57) ABSTRACT

A portable storage assembly includes an A-frame having two side members pivotably attached at their upper edges and pivotable between open and closed positions. A saddlebag having a plurality of storage pockets formed thereon is removably attached to the frame.

16 Claims, 5 Drawing Sheets

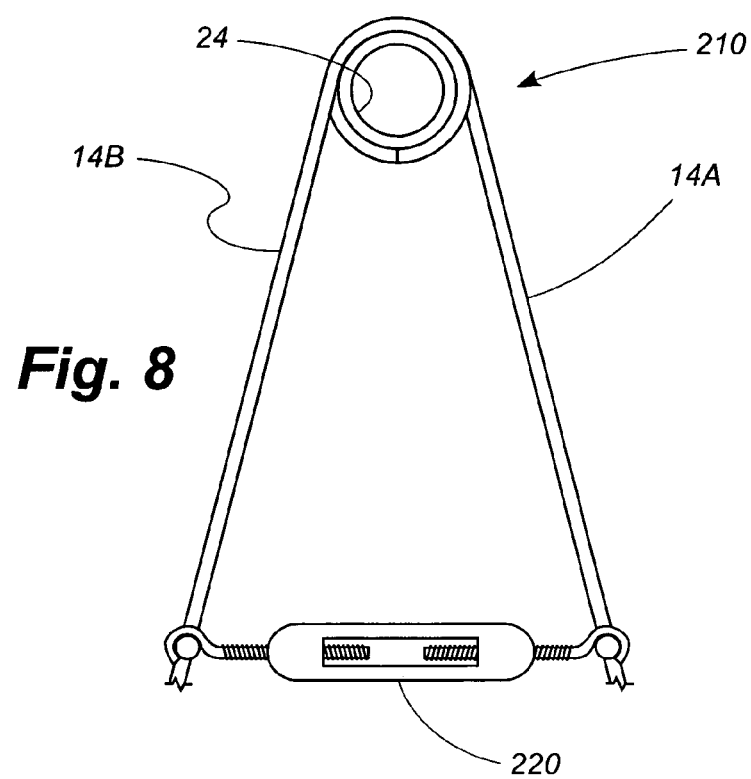
*Fig. 8*
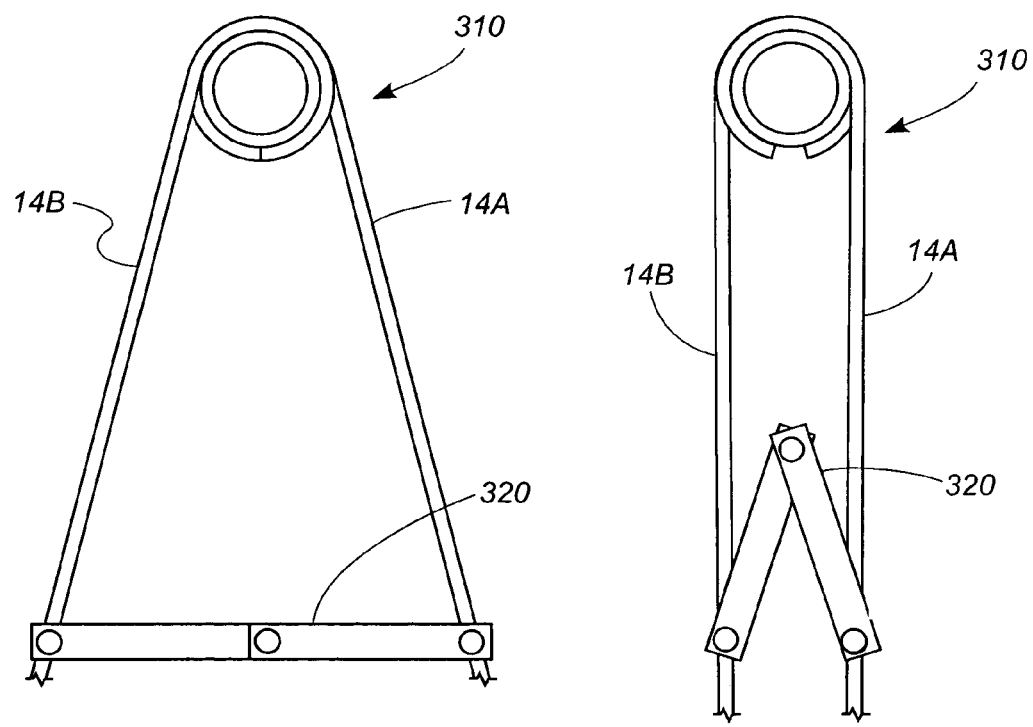
*Fig. 9*  *Fig. 10*

TRUCKER'S ORGANIZATION AND STORAGE UNIT

TECHNICAL FIELD

The present invention relates to devices for the storage and organization of personal objects and specifically relates to a device for use by motor vehicle drivers.

BACKGROUND OF THE INVENTION

Motor vehicle drivers must carry a variety of personal objects such as licenses, permits, maps, directions, phones, wallets or other objects. In addition, drivers of commercial trucks may have to carry permits and delivery information regarding the items in transport. A driver may encounter several problems while he or she is on the road and needs to store and organize these objects.

One common problem is the lack of a single, centralized location to store the objects. Without a centralized location the objects can become lost and scattered throughout the motor vehicle. Oftentimes personal objects must be accessible quickly, for example if the driver is required to go through a security checkpoint or weighing station. In these cases, the driver might have to fumble through the glove box, center console, or his or her wallet or briefcase to find a particular object. Searching for an object in these different compartments can lead to frustration and delays.

Another problem encountered by drivers is carrying these personal objects between the motor vehicle and the arrival destination. For example, when a trucker reaches a checkpoint he or she might need to carry in a bundle of paperwork from the truck. When this paperwork is spread about inside the motor vehicle, it takes time to gather the necessary paperwork together, thus creating delays and it is also inconvenient for the driver, who may be carrying several different things in his hands. Therefore, it is desired to have an apparatus that can store and organize a wide assortment of personal objects in a centralized, easily accessible manner while allowing the driver to easily transport his or her personal objects from the motor vehicle to the arrival destination.

Two types of existing products have attempted to solve the storage and organization problems discussed above: briefcases and over-the-seat organizers. Briefcases may keep the driver's belongings in a centralized location, but objects kept in a briefcase are not easily accessible. To reach objects within a briefcase, the driver needs both hands to open the case, which may be difficult if the driver is also handling other objects. Also, opening the briefcase requires a flat surface large enough to place the briefcase on. Traditionally, a driver may place the briefcase on his or her lap or the passenger seat. Placing the briefcase on one's lap is disadvantageous because the steering column prohibits the case from opening fully. Placing the briefcase on the passenger seat is disadvantageous because the two seats might be separated by a center console or a large space that forces the driver to shift uncomfortably and reach in his or her own seat. Moreover, briefcases are lightweight and usually have slick surfaces, causing them to fall off the seat when the motor vehicle comes to a stop or travels over uneven roads.

Another traditional solution for the organization needs of drivers is an over-the-seat organizer, which has similar problems as a briefcase discussed above. These organizers are usually hung over or placed upon the passenger's seat, so to access objects within the organizer the driver may have to reach across a center console or a large space. In addition, over-the-seat organizers are not suitable for transporting objects to and from the motor vehicle and the driver's destination, because over-the-seat organizers are either not free standing or they are large and bulky, thus making carrying cumbersome and awkward. Alternatively, the driver could remove objects from the organizer, but this solution is disadvantageous because without a carrying case the objects become lost more easily, and it fills the driver's hands up so that he or she cannot carry other things. One example of an over-the-seat organizer is U.S. Pat. No. 5,551,616 which discloses a box-like structure that is designed to be strapped into the passenger's seat.

SUMMARY OF THE INVENTION

The present invention is primarily designed for use by drivers or passengers in motor vehicles; more specifically for use by drivers of large commercial trucks. However, the invention can additionally be used as a tool organizer, sewing notions organizer, artist's organizer, or any other application wherein a user needs to store and organize personal objects.

In one embodiment, the present invention comprises a frame with two side members that are attached at their upper ends, and can pivot between an open and closed position. Another aspect of the present invention comprises a saddlebag that is attached to the frame. The saddlebag comprises an interior sheet that contacts the frame's side members, with at least one exterior sheet which provides a plurality of storage compartments. In yet another aspect of the present invention, there is a means to secure the side members in the open position.

BRIEF DESCRIPTION OF THE DRAWINGS

FIG. 8 is an end view of the upper section of a first alternate embodiment of a storage device in which the means for securing the side members in the open position comprises a turnbuckle.

FIG. 9 is an end view of the upper section of a second alternate embodiment of a storage device in which the means for securing the side members in the open position comprises a hinge.

FIG. 10 is another end view of the device of FIG. 9 showing the frame folded and the hinge in a closed position.

DETAILED DESCRIPTION OF THE DRAWINGS

Figure 1:
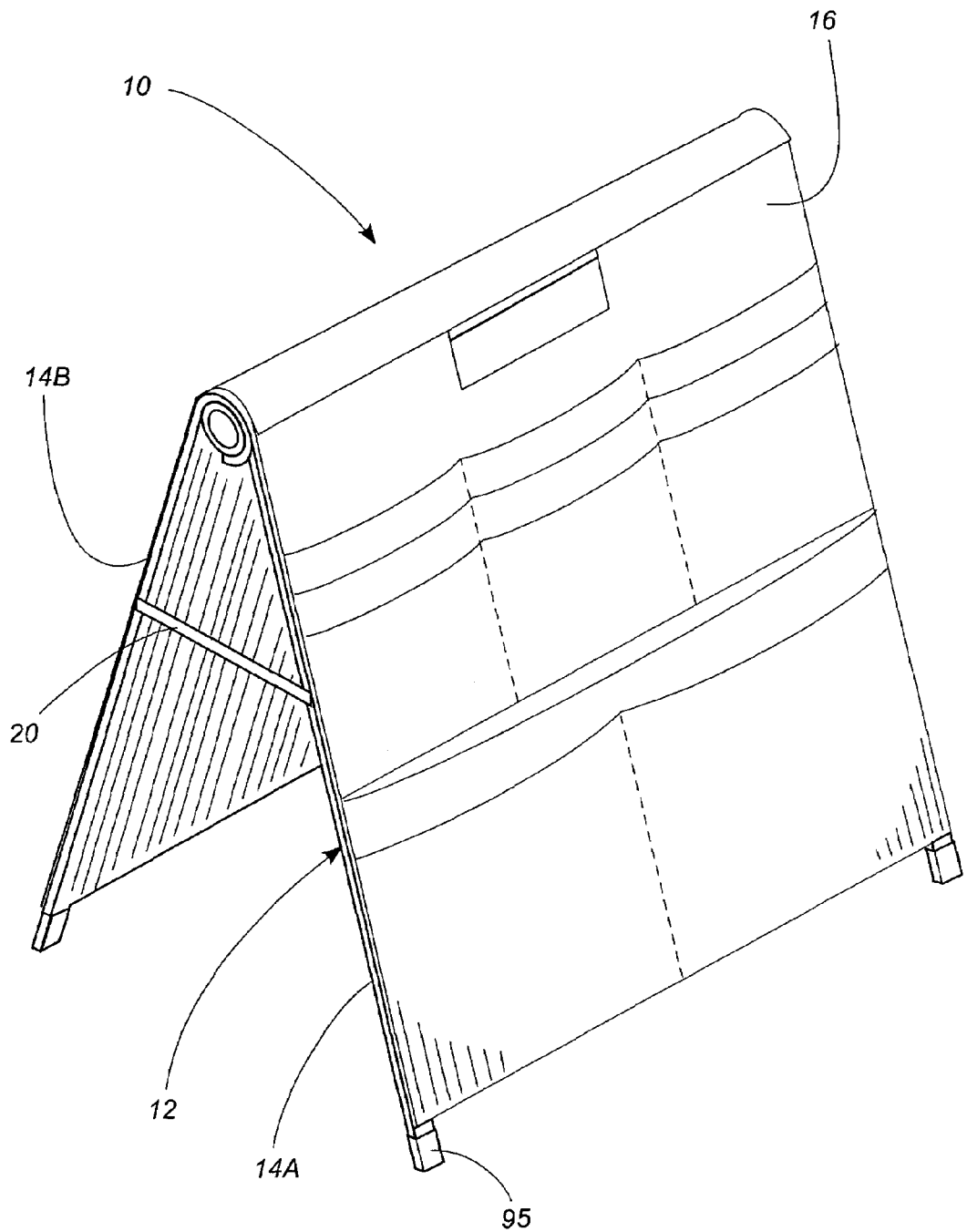
FIG. 1 is an isometric view of an embodiment of a portable storage device.

Referring now to the drawings in which like numerals indicate like elements throughout the several figures, FIGS.

1-7 illustrate a first embodiment of a portable storage device 10 of the present invention. As is shown in FIG. 1, the portable storage assembly 10 comprises an "A-frame" 12 with two side members 14A, 14B pivotable between an open and closed position; a saddlebag 16 having a plurality of storage compartments and being mounted to the frame; and an arm 20 to secure the side members 14A, 14B in the open position. Each of these components will be discussed in greater detail below.

Figure 2:
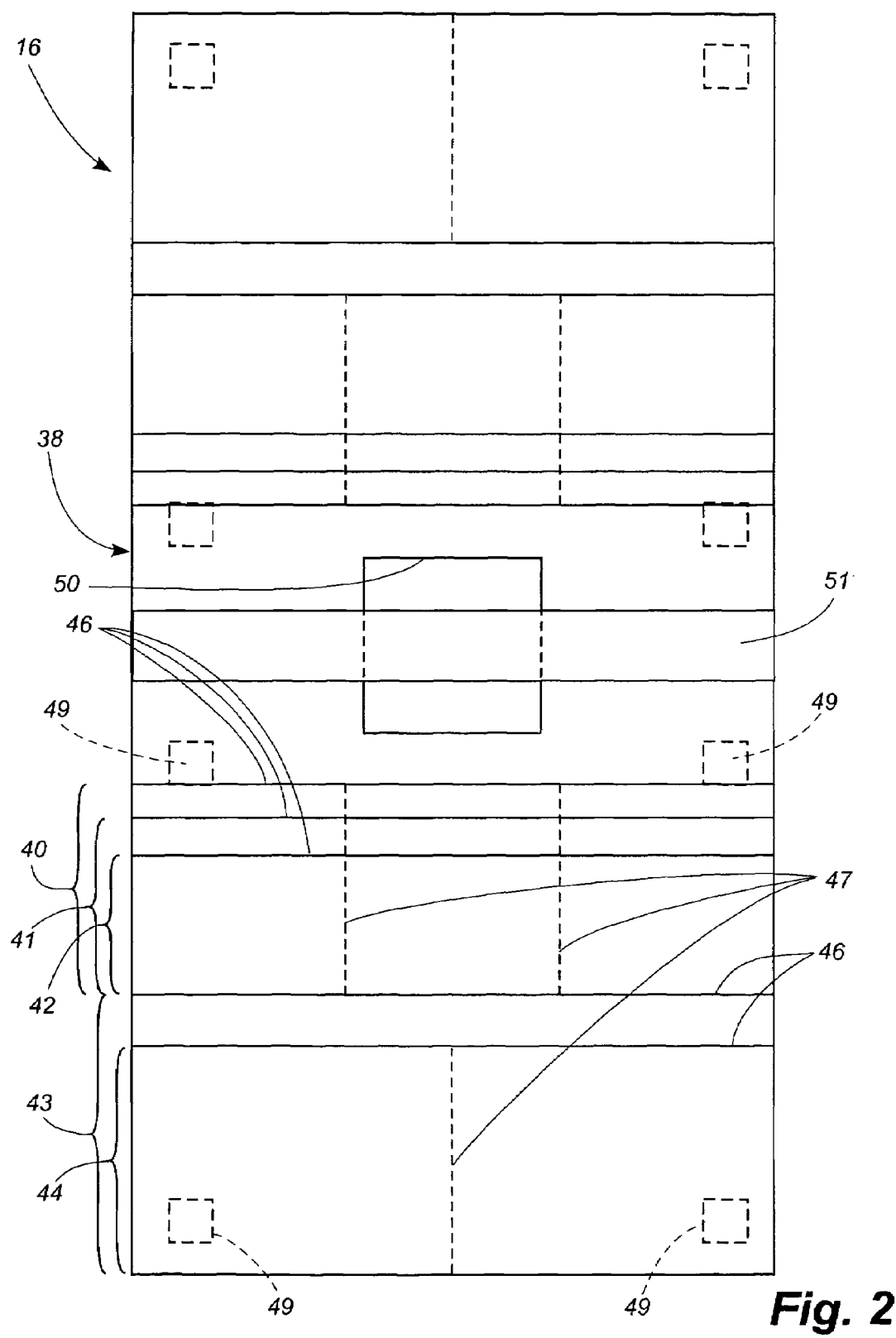
FIG. 2 is a plan view of an embodiment of a saddlebag of the portable storage device of FIG. 1.

FIG. 2 illustrates the saddlebag 16 detached from the frame 12. The saddlebag 16 comprises an interior sheet 38 that contacts the frame side members 14A and 14B (FIG. 1), and exterior sheets 40-44 which face outward when the saddlebag 16 is attached to the frame side members 12 and 14. The exterior sheets 42-44 are attached to the interior sheet 38 along their bottom edges and their two side edges. The top edge of each exterior sheet 40-44 is left unattached, and is oriented upward when the saddlebag is mounted to the frame 12, thus providing a plurality of upwardly opening storage pockets 46. Additional storage pockets 46 can be formed by attaching the exterior sheets 40-44 to the interior sheet 38 along vertical lines 47. (Note that the vertical lines 47 are shown as dashed lines to indicate stitches, not to indicate hidden lines). The vertical lines 47 can be placed at any position on the exterior sheets 40-44, thus providing different sized storage pockets 46. Furthermore, convenient access may be had to the storage pockets 46 by providing exterior sheets 40-44 having varying heights, so that the unattached open ends of the layered exterior sheets are spaced at varying heights. Both the interior and exterior sheets can be made of any type of flexible material such as canvas, denim, leather, or the like and can be attached together by rivets, sewing, gluing, or any other suitable method.

In the embodiment of FIG. 2 the upper portion of the saddlebag is a mirror image of the lower portion, though it will be appreciated that this is not a requirement and that different configurations of storage pockets 46 can be provided on the upper and lower portions.

On the reverse side of the interior sheet 38, a plurality of hook and loop fasteners 49 are attached.

In the center of the interior sheet 38 an opening 50 is formed. As will be seen, when the saddlebag 16 is attached to the frame 12, a handle can be gripped through this opening 50. A strip 51 extends from one lateral edge of the interior sheet 38 to the other and extends across the opening 50.

Figure 3:
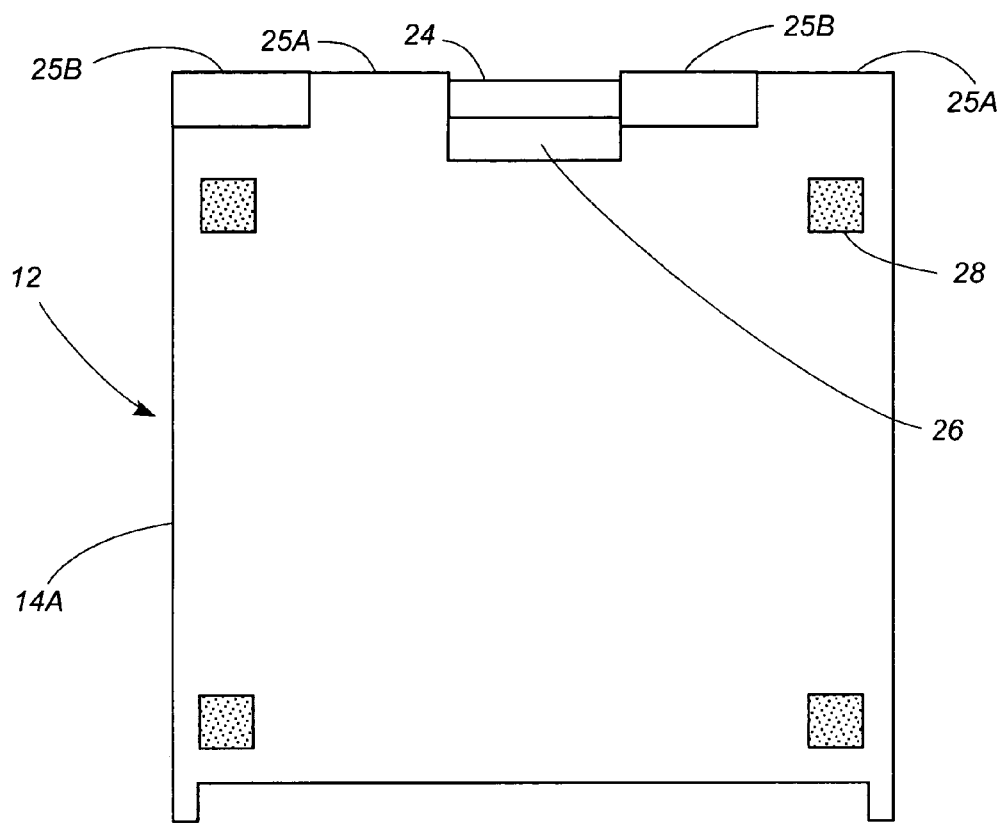
FIG. 3 is a side view of a frame of the portable storage device of FIG. 1.
Figure 4:
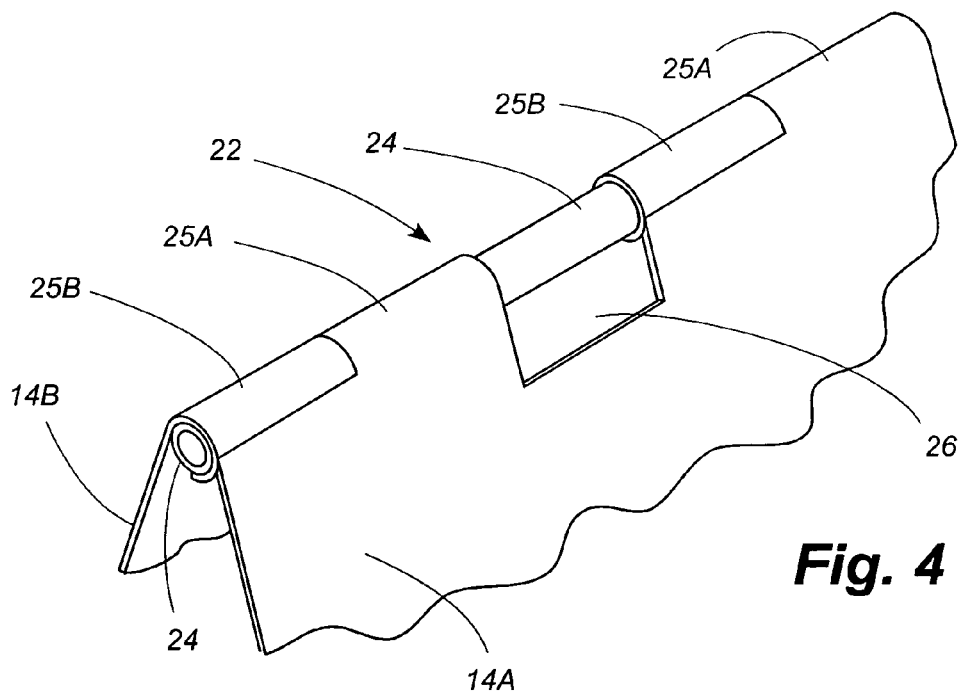
FIG. 4 is an isometric view of a handle of the portable storage device of FIG. 1.

Referring now to FIGS. 3 and 4, the two side members 14A, 14B of the frame 12 are attached at their upper ends by a pivot attachment 22. The pivot attachment 22 includes a rod 24 to which the side members 14A, 14B are mounted by means of hinge members 25A (on side member 14A) and 25B (on side member 14B). The side members 14A, 14B are pivotable between an open position, as shown in FIG. 1, and a closed position, in which the lower ends of the side members are adjacent one another. In the open position, the bottom edges of the side members 14A and 14B are spaced a sufficient distance apart to provide a steady base for the portable storage device 10, while the top edges of the side members 14A, 14B are in a substantially collinear position, thus forming an angle between the side members. In this position the portable storage assembly 10 is free standing, and can be placed on a supporting surface to provide easy access to objects stored in the assembly.

In the closed position, the bottom edges of the side members 14A, 14B are spaced more closely together while the top edges of the side members 14A, 14B remain in a collinear position, thus eliminating the angle between side members 14A, 14B and making them essentially parallel. In this position the frame 12 is flat and enables the portable storage assembly 10 to be carried and stored more easily.

An opening 26 is formed in the central upper edge of the frame 12, exposing a portion of the rod 24 for use as a handle. The opening 26 extends sufficiently far below the rod 24 that the fingers of a hand can comfortably reach through the opening to grasp the rod.

Also shown in FIG. 3 are mating portions of hook and loop fasteners 28, which engage the corresponding hook and loop fasteners 49 on the reverse side of the interior sheets 38 of the saddlebag 16 to retain the saddlebag on the frame 12.

Figure 5:
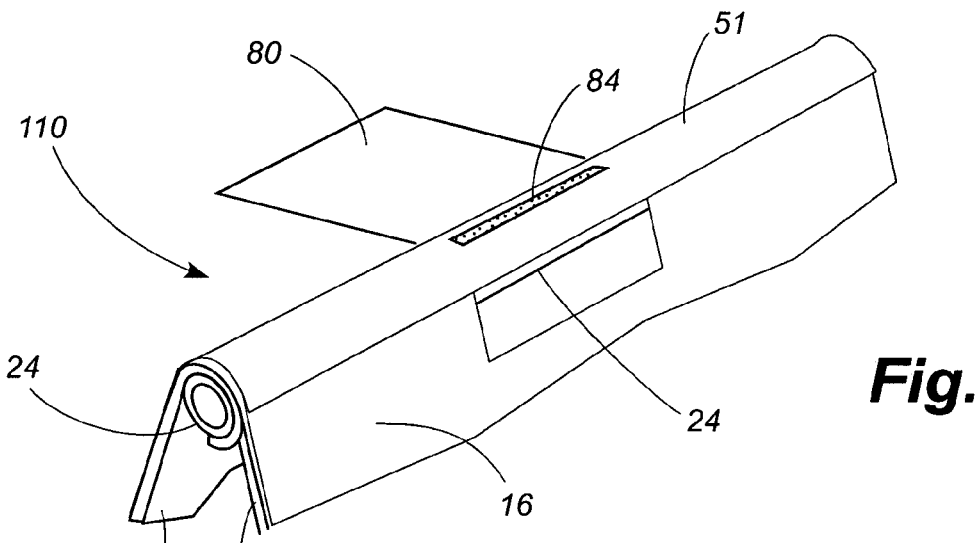
FIG. 5 is an isometric view of the upper end of the portable storage device of FIG. 1 showing a handle wrap in an unfastened position.
Figure 6:
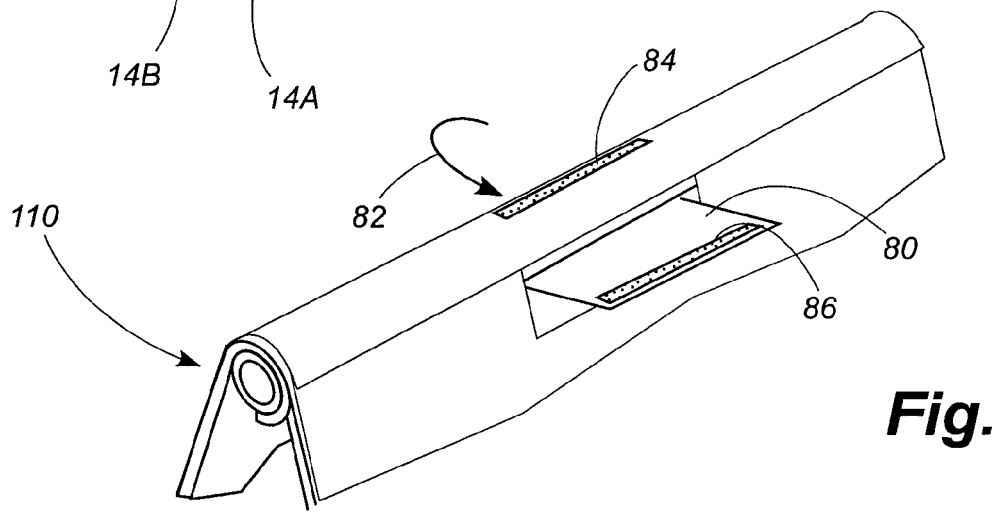
FIG. 6 is an isometric view of the upper end of the portable storage device of FIG. 1 showing the handle wrap being wrapped around the handle.
Figure 7:
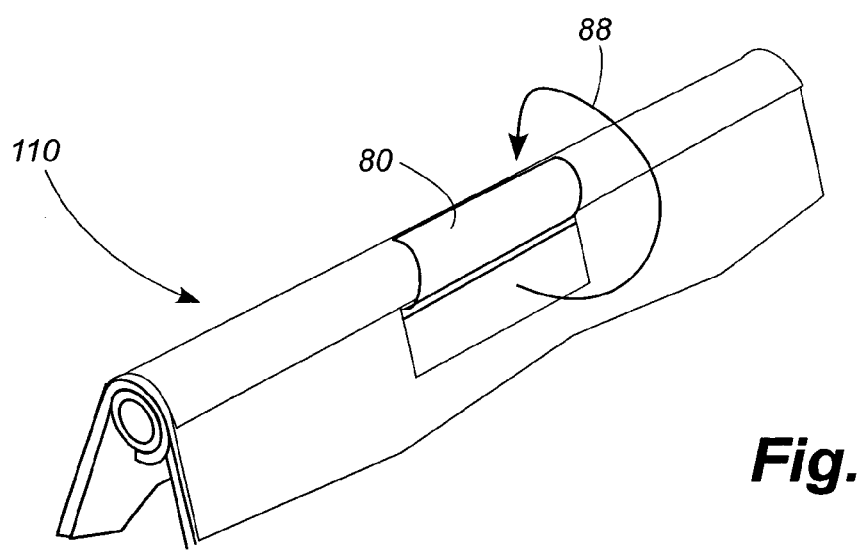
FIG. 7 is an isometric view of the upper end of the portable storage device of FIG. 1 showing the handle wrap wrapped around the handle.

Referring now to FIGS. 5-7, an alternate embodiment 110 of a portable storage device comprises a strip which serves as a padded handle and as a means for securing the saddlebag 16 to the frame 12. A strip 80 is stitched or otherwise secured to the strip 51 of the saddlebag 16. The strip 80 is wrapped under the exposed portion of the rod 24 in the direction indicated by the arrow 82. The strip 80 is then wrapped around the rod 24 until cooperating hook and loop fasteners 84, 86 on the strip 51 and strip 80, respectively, are engaged.

Referring again to FIG. 1, the arm 20 secures the side members 14A, 14B in a fixed angular position. The arm 20 is pivotably mounted the side member 14A, 14B. A hook is formed in the free end of the arm 20, and the hook engages a pin mounted to the other side member 14B.

An alternate arrangement to secure the side members 14A, 14B in fixed angular position is illustrated in FIG. 8. A portable storage device 210 includes a turnbuckle 220. Like the arm 20, the turnbuckle 220 is pivotably mounted to one side member 14A and has a hook formed in its free end. The hook engages a pin formed on the other side member 14B. To operate the turnbuckle 220, the user rotates the turnbuckle 220 until the side members 14A and 14B have pivoted to the desired angular relation. Thus the device 210 is adjustable to permit control of the angle between the side members 14A, 14B. Such means is advantageous because it allows the portable storage assembly 10 to be adapted for use in a wide variety of locations. For example, if the portable storage assembly 10 is placed in a motor vehicle between two seats spaced closely together, the angle between side members 14A, 14B must be small to fit between the seats. On the other hand, if the portable storage assembly 210 is placed in a large commercial truck with seats spaced far apart, the angle between the side members 14A, 14B can be large to provide a more stabile base to prevent the device 210 from tipping.

FIGS. 9 and 10 illustrate yet another device 310 for securing the side members 14A, 14B in fixed relation. A hinge 320 is pivotably mounted to both side members 14A, 14B and pivots in the middle to open or close.

Another aspect of the frame of the portable storage assembly 10 can be a friction means disposed on a section of the frame that engages a support surface as illustrated in FIG. 1. In the embodiment shown, the friction means is a rubber coated foot 95, but the friction means can also include a rubber coating that covers the bottom edge of each side member 12 and 14. The rubber coated foot 95 is provided to inhibit movement of the portable storage assembly 10 relative to the support surface. For example, if the portable storage assembly 10 is placed on the floorboard of a motor vehicle, the rubber coated foot 95 would inhibit the portable storage assembly 10 from moving if the motor vehicle came to an abrupt stop or traveled over a rough road.

The use of hook and loop fasteners 28, 49 to secure the saddlebag 16 to the frame 12 allows for the saddlebag to be removed from the frame if the user desires to wash the saddlebag. Other means for removably attaching the saddlebag 16 to the frame 12 can include at least one of the following: snaps, buttons, or ties. Finally, it will be understood that the preferred embodiment has been disclosed by way of example, and that other modifications may occur to those skilled in the art without departing from the scope and spirit of the appended claims.

What is claimed is:

1. A portable storage assembly comprising:
    a) a frame, comprising two side members pivotably attached at their upper edges and pivotable between an open and closed position; and
    b) a saddlebag comprising:
        i) an interior sheet contacting the frame side members; and
        ii) at least one exterior sheet providing a plurality of storage compartments; said saddlebag being attached to said frame; and
    c) a means to secure the side members in the open position.

2. The portable storage assembly of claim 1, wherein (b) the saddlebag comprises two exterior sheets.

3. The portable storage assembly of claim 1, wherein (b)(ii), the plurality of storage compartments are formed by attaching the exterior sheet to the interior sheet along three edges, leaving an unattached open end oriented upward on the portable storage assembly.

4. The portable storage assembly of claim 3, wherein (b)(ii), the plurality of storage compartments are formed by layering at least two exterior sheets so that the unattached open ends of said exterior sheets are spaced at varying heights.

5. The portable storage assembly of claim 3, wherein (b)(ii), the plurality of storage compartments are formed by attaching the exterior sheet to the interior sheet along a vertical line.

6. The portable storage assembly of claim 1, wherein the saddlebag is attached to the frame by at least one fixation member.

7. The portable storage assembly of claim 6, wherein the fixation member includes hook fasteners on one side of said saddlebag and said side members, and loop fasteners on the other side of said saddlebag and said side members.

8. The portable storage assembly of claim 1, wherein (c), a means to secure the side members in the open position, comprises at least one of the following: a turnbuckle, a brace, or a hinge.

9. The portable storage assembly of claim 1, wherein (c), a means to secure the side members in the open position, comprises an adjustable means to permit control of the angle between said side members.

10. The portable storage assembly of claim 1, further comprising a friction means disposed on a section of the frame that engages a support surface to inhibit movement of the portable storage assembly relative to said support surface.

11. The portable storage assembly of claim 1, further comprising:
    e) a handle for transporting the assembly.

12. The portable storage assembly of claim 11, wherein said frame comprises a rod to which said side members are pivotably attached at their upper ends, and wherein said backing sheet defines a hole through which said rod can be grasped, and wherein said handle (e) comprises said rod.

13. The portable storage assembly of claim 12, further comprising a strip with hook and loop fastening means fastened adjacent to said hole, wherein said strip wraps around the rod and is secured by said hook and loop fastening means.

14. The portable storage assembly of claim 1, wherein each side member comprises a single rigid sheet of material.

15. The portable storage assembly of claim 1, wherein each side member comprises:
    i) a bottom horizontal brace with a first end and a second end;
    ii) a first vertical brace connected to the first end of the bottom brace;
    iii) a second vertical brace connected to the second end of the bottom brace.

16. The portable storage assembly of claim 15, further comprising a second horizontal brace connected to the upper ends of said first and second vertical braces.

* * * * *